(12) United States Patent
Marisetty et al.

(10) Patent No.: US 7,533,300 B2
(45) Date of Patent: May 12, 2009

(54) CONFIGURABLE ERROR HANDLING APPARATUS AND METHODS TO OPERATE THE SAME

(75) Inventors: Suresh Marisetty, Fremont, CA (US); Baskaran Ganesan, Bangalore (IN); Gautam Bhagwandas Doshi, Bangalore (IN); Murugasamy Nachimuthu, Hillsboro, OR (US); Koichi Yamada, Los Gatos, CA (US); Jose A. Vargas, Rescue, CA (US); Jim Crossland, Banks, OR (US); Stan J. Domen, Roseville, CA (US)

(73) Assignee: Intel Corporation, Santa Clara, CA (US)

( * ) Notice: Subject to any disclaimer, the term of this patent is extended or adjusted under 35 U.S.C. 154(b) by 449 days.

(21) Appl. No.: 11/352,961

(22) Filed: Feb. 13, 2006

(65) Prior Publication Data

US 2007/0220332 A1 Sep. 20, 2007

(51) Int. Cl.
*G06F 11/00* (2006.01)

(52) U.S. Cl. .......................................... 714/27; 714/48
(58) Field of Classification Search .................. 714/48, 714/27
See application file for complete search history.

(56) References Cited

U.S. PATENT DOCUMENTS

| | | | | |
|---|---|---|---|---|
| 5,245,615 | A * | 9/1993 | Treu ............................. | 714/45 |
| 6,622,260 | B1 * | 9/2003 | Marisetty et al. .............. | 714/10 |
| 2004/0019835 | A1 * | 1/2004 | Marisetty et al. .............. | 714/48 |
| 2004/0078681 | A1 * | 4/2004 | Ramirez ....................... | 714/37 |
| 2005/0193271 | A1 * | 9/2005 | Linam et al. .................. | 714/39 |
| 2006/0031706 | A1 * | 2/2006 | Ramirez ........................ | 714/1 |
| 2006/0075301 | A1 * | 4/2006 | Fossum et al. ................. | 714/38 |
| 2006/0143515 | A1 * | 6/2006 | Kuramkote et al. ........... | 714/15 |

OTHER PUBLICATIONS

U.S. Appl. No. 11/227,831, filed Sep. 15, 2005, Marisetty et al.
U.S. Appl. No. 11/009,166, filed Dec. 10, 2004, Marisetty et al.

* cited by examiner

*Primary Examiner*—Michael C Maskulinski
(74) *Attorney, Agent, or Firm*—Hanley, Flight & Zimmerman

(57) ABSTRACT

Configurable error handling apparatus and methods to operate the same are disclosed. An example apparatus comprises a processor core in a semiconductor package, a hardware functional block in the semiconductor package, an error handler in the semiconductor package, wherein the error handler is configurable to route error data from the hardware functional block to at least one of a first error log or a second error log and to route error signals from the hardware functional block to at least one of an operating system or firmware, and wherein the processor core configures the error handler and the hardware functional block.

23 Claims, 5 Drawing Sheets

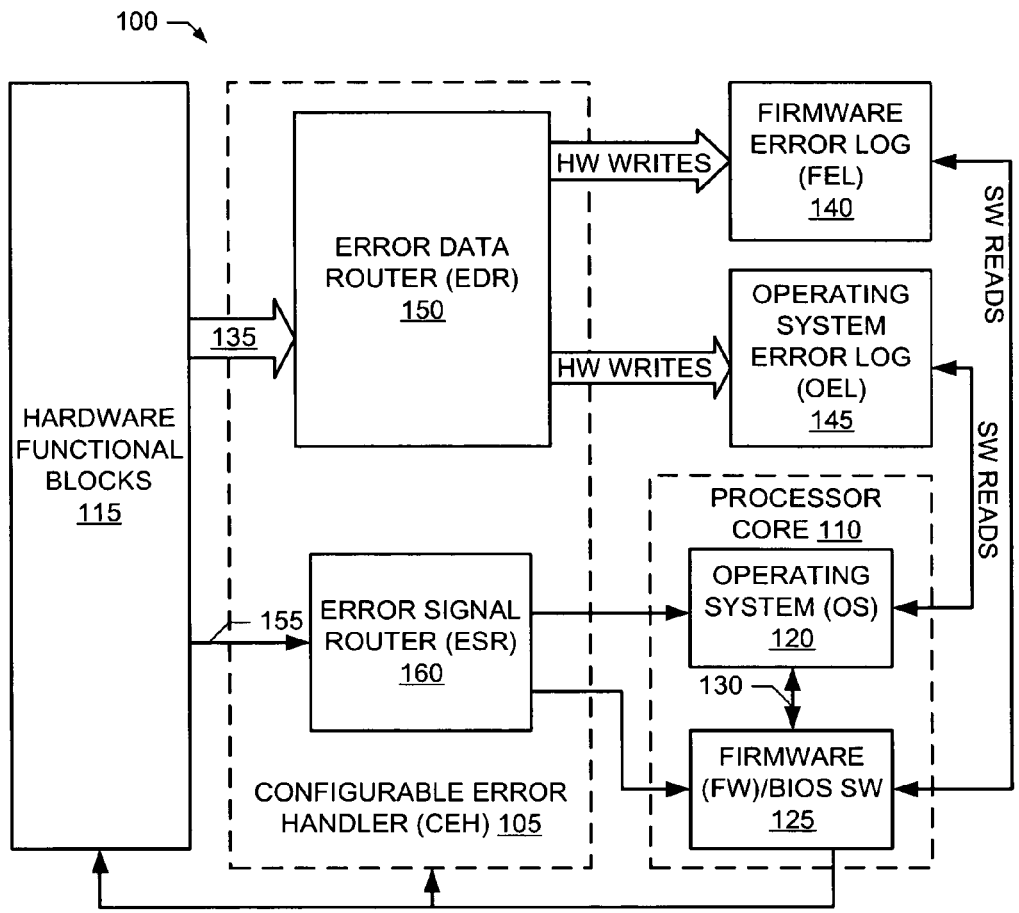
FIG. 1
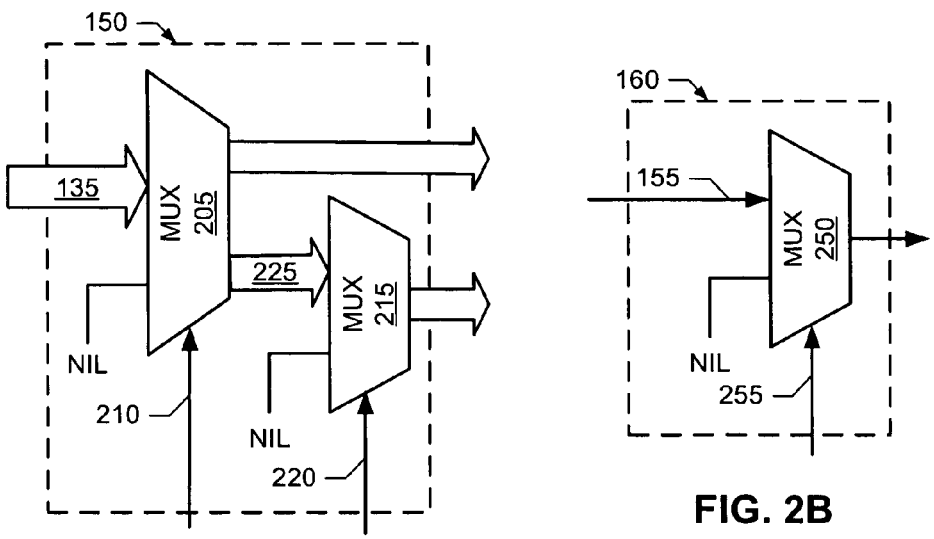
FIG. 2A
FIG. 2B

| I/F 130 | ERROR TYPE 310 | CONFIGURATION | | LOGS | | ERROR HANDLING | | |
|---|---|---|---|---|---|---|---|---|
| | | SIGNAL 315 | ENABLE 220 | FEL 140 | OEL 145 | FW 125 | OS 120 | |
| NOT AVAILABLE | CORRECTED | NIL | 1 | AVAILABLE | AVAIL. | NONE | POLL OEL | ⎫ 320 |
| | | | 0 | | EMPTY | NONE | NONE | |
| | | SMI | 1 | | AVAIL. | SMI HANDLER | POLL OEL | |
| | | | 0 | | EMPTY | SMI HANDLER | NONE | ⎫ 325 |
| | | CPEI | 1 | | AVAIL. | NONE | CPEI HANDLER | |
| | | | 0 | | EMPTY | NONE | NONE | |
| | UNCORRECTED | MCERR | 1 | AVAILABLE | AVAIL. | NONE | MCERR HANDLER | |
| | | | 0 | | EMPTY | NONE | NONE | |
| | | SMI | 1 | | AVAIL. | SMI HANDLER | NONE | |
| | | | 0 | | EMPTY | SMI HANDLER | NONE | |
| | | NMI | 1 | | AVAIL. | NMI HANDLER | NONE | |
| | | | 0 | | EMPTY | NMI HANDLER | NONE | |
| AVAILABLE | CORRECTED | NIL | 1 | AVAILABLE | AVAIL. | NONE | POLL OEL OR FEL | ⎫ 330 |
| | | | 0 | | EMPTY | NONE | POLL FEL | |
| | | SMI | 1 | | AVAIL. | SMI HANDLER | POLL OEL OR FEL | |
| | | | 0 | | EMPTY | SMI HANDLER | POLL FW LOGS | |
| | | CPEI | 1 | | AVAIL. | NONE | CPEI HANDLER, OEL OR FEL | |
| | | | 0 | | EMPTY | NONE | CPEI HANDLER, FEL | |
| | UNCORRECTED | MCERR | 1 | AVAILABLE | AVAIL. | NONE | MCERR HANDLER, OEL OR FEL | |
| | | | 0 | | EMPTY | NONE | MCERR HANDLER, FEL | |
| | | SMI | 1 | | AVAIL. | SMI HANDLER | NONE | |
| | | | 0 | | EMPTY | SMI HANDLER | NONE | |
| | | NMI | 1 | | AVAIL. | NMI HANDLER | NONE | |
| | | | 0 | | EMPTY | NMI HANDLER | NONE | |

FIG. 3

| ERROR TYPE | SIGNALING | LOGGING IN OEL | LOGGING IN FEL |
|---|---|---|---|
| CORRECTED | NIL | YES | NO |
| UNCORRECTED | MCERR | YES | NO |
| FATAL | MCERR | YES | NO |

FIG. 4A

| ERROR TYPE | SIGNALING | LOGGING IN OEL | LOGGING IN FEL |
|---|---|---|---|
| CORRECTED | CPEI | YES | NO |
| UNCORRECTED | MCERR | YES | NO |
| FATAL | MCERR | YES | NO |

FIG. 4B

| ERROR TYPE | SIGNALING | LOGGING IN OEL | LOGGING IN FEL |
|---|---|---|---|
| CORRECTED | SMI | NO | YES |
| UNCORRECTED | SMI | NO | YES |
| FATAL | SMI | NO | YES |

FIG. 4C

| ERROR TYPE | SIGNALING | LOGGING IN OEL | LOGGING IN FEL |
|---|---|---|---|
| CORRECTED | CPEI | YES/NO | YES |
| UNCORRECTED | MCERR | YES/NO | YES |
| FATAL | MCERR | YES/NO | YES |

FIG. 4D

CONFIGURABLE ERROR HANDLING APPARATUS AND METHODS TO OPERATE THE SAME

FIELD OF THE DISCLOSURE

This disclosure relates generally to error handling in processor platforms and, more particularly, to configurable error handling apparatus and methods to operate the same.

BACKGROUND

A conventional computing platform comprises a printed circuit board (PCB), commonly referred to as a motherboard, including a processor and one or more additional chips (e.g., memory controllers, video graphic adapters, etc.) that together form a processing core for the computing platform. Among other things, the designer and/or manufacturer of the PCB designs and/or configures how hardware error events are handled by the computing platform. For instance, the designer and/or manufacturer may connect hardware error indicating output signals from the one or more additional chips to interrupt inputs for the processor, thereby making the processor aware when a hardware error has occurred on the motherboard. Further, the designer and/or manufacturer may provide firmware and/or configure an operating system executing on the processor to control how hardware error events are processed. While a first example manufacturer relies on the operating system to own and handle all hardware error events and hardware error information, another manufacturer relies on the firmware to handle all hardware error events and to configure the firmware to hide hardware resources from the operating system. Further, the two example manufacturers may utilize different types of external processor interrupts (e.g., system management interrupt (SMI), non-maskable interrupt (NMI), etc.) to indicate hardware error events to the processor.

Increasingly, semiconductor device designers and/or manufacturers are implementing more of the functionality provided by the one or more additional chips inside the semiconductor package of the processor. Further, the semiconductor package may include multiple processor cores. However, such conventional system-on-a-chip devices eliminate the current flexibility that the designer and/or manufacturer of a computing platform have to control how and/or where error event handling is performed. In particular, the computing platform designer and/or manufacturer no longer has access to hardware error control signals provided by the functional blocks implementing the functionality previously provided by the one or more additional chips and, thus, is unable to route, via the PCB, the hardware error signals to desired destinations (e.g., processor interrupts). Instead, the semiconductor device designer and/or manufacturer controls and/or determines the routing of the hardware error control signals.

BRIEF DESCRIPTION OF THE DRAWINGS

FIG. 1 is a schematic illustration of an example device including a configurable error handler.

FIG. 2A illustrates an example manner of implementing the error data router of FIG. 1.

FIG. 2B illustrates an example manner of implementing the error signal router of FIG. 1.

FIGS. 3 and 4A-D are tables illustrating example operating modes for the example configurable error handler of FIG. 1.

DETAILED DESCRIPTION

Figure 5:
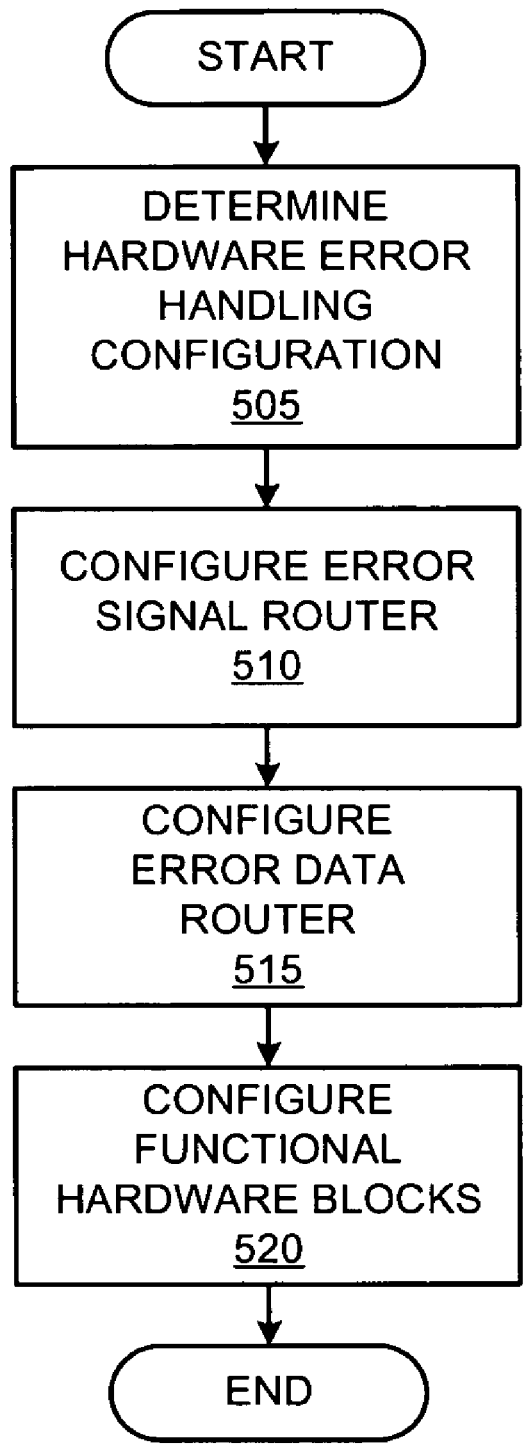
FIG. 5 is a flowchart illustrating an example process that may be carried out to operate and/or configure the example configurable error handler of FIG. 1.

Configurable error handling apparatus and methods to operate the same are disclosed. A disclosed example apparatus comprises a semiconductor package, a processor core in the semiconductor package, a hardware functional block in the semiconductor package, an error handler in the semiconductor package, wherein the error handler is configurable to route error data from the hardware functional block to at least one of a first error log or a second error log and to route error signals from the hardware functional block to at least one of an operating system or firmware, and wherein the processor core configures the error handler and the hardware functional block.

A disclosed example configurable error-handling circuit for a package comprising a processor core and a functional block comprises an error data router to route error information from the functional block to at least one of a first error log or a second error log and an error signal router to route error signals from the functional block to at least one of an operating system or firmware, wherein the configurable error-handling circuit is in the package.

For a semiconductor device comprising a processor core and a hardware function block, a disclosed example method comprises determining an error handling mode for the semiconductor device, configuring the hardware function block based on the error handling mode, and configuring an error-handling circuit in the semiconductor device to route error information from the hardware function block to at least one of firmware or an operating system executing on the processor core.

FIG. 1 is a schematic illustration of an example device 100 including a configurable error handler (CEH) 105 (e.g., a configurable error-handling circuit 105). In the example of FIG. 1, the CEH 105 is implemented within a semiconductor package that includes, among other things one or more of any variety of processor cores, one of which is shown at reference numeral 110, and one or more hardware functional blocks 115. The processor core 110 may be any type of processing unit, such as, for example, a microprocessor core from the Intel® families of microprocessors. In the illustrated example, the hardware functional blocks 115 include functional blocks, circuits, circuit blocks, gates, etc. that implement functionality previously provided by one or more chips located external to the device 100. Example hardware functional blocks are memory controllers, video graphic adapters, input/output (I/O) controller hubs (ICH), network interfaces, etc. Additionally or alternatively, the hardware functional blocks 115 may include functional blocks, circuits, circuit blocks, gates, etc. implemented by and/or within any of the processor cores. The processor 110 and the hardware functional blocks 115 may be implemented on a common substrate or may be implemented on one or more substrates and then combined, using any of a variety of techniques, into a multichip module (MCM).

As is conventional, the one or more of any variety of processor cores (e.g., the processor core 110) execute machine readable instructions to implement both an operating system (OS) 120 and firmware (FW) and/or basic input/output system (BIOS) software 125. For instance, in an example multiple processor core device 100, the multiple processor cores 110 may collectively execute machine readable instructions to implement the OS 120. As such, the relationship shown in FIG. 1 amongst the processor core 110, the OS 120 and FW 125 is merely illustrative of one example implementation. For readability, the term FW 125 will be used herein to refer to the FW and/or BIOS SW 125.

In the example of FIG. 1, the FW 125 handles configuration and/or control of the hardware functional blocks 115 using techniques substantially similar to those that would be used by the FW 125 to configure and/or control the hardware functional blocks 115 if they were implemented by one or more chips external to the device 100. Alternatively, other machine readable instructions executed by the processor core 110 may configure and/or control the hardware functional blocks 115. In some implementations, the FW 125 may hide some or all aspects of the hardware functional blocks 115 from the OS 120, for example, the OS 120 may operate without specific knowledge of the implementation details (e.g., configuration registers, status registers, etc.) of the hardware functional blocks 115. The OS 120 and the FW 125 may optionally implement an interface 130 that allows the OS 120 to, for example, access registers and/or data normally only accessible to the FW 125. The example interface 130 of FIG. 1 may be implemented by, for example, an extended firmware interface (EFI), a FW runtime service, any variety of virtual machine monitor (VMM) and/or hypervisor executing between the OS 120 and the FW 125, etc.

To control how and/or where hardware error information from the hardware functional blocks 115 is handled and/or processed, the example semiconductor device 100 includes the CEH 105. In particular, the CEH 105 may be configured by the FW 125 to route hardware error data 135 (e.g., information specifying a location and/or data related to an error) to neither, one or both of a FW error log (FEL) 140 or an OS error log (OEL) 145. To route the hardware error data 135 to neither, one or both of the FEL 140 or the OEL 145, the example CEH 105 includes an error data router (EDR) 150. An example EDR 150 is discussed below in connection with FIG. 2A. The EDR 150 performs hardware (HW) writes to store routed error data 135 in the FEL 140 and/or the OEL 145. In the example of FIG. 1, the FEL 140 may be implemented using registers such as, for example, error configuration space registers (CSRs) accessible by the FW 125; and the OEL 145 may also be implemented using registers such as, for instance, machine check (MC) banks, model specific registers (MSRs), etc. accessible by the OS 120. It will be readily apparent to persons of ordinary skill in the art that the FEL 140 and/or the OEL 145 may also be implemented using any other suitable technique, device and/or circuit.

The example CEH 105 may also be configured by the FW 125 to route hardware error indication signals 155 (e.g., interrupts) to neither, one or both of the OS 120 or the FW 125. To route the hardware error interrupts 155 to neither, one or both of the OS 120 or the FW 125, the example CEH 105 includes an error signal router (ESR) 160. In the example, of FIG. 1, the FW 125 configures a hardware functional block 115 to provide hardware error interrupt signals in response to hardware error events and, in particular, the FW 125 can configure the hardware function block 115 to provide a specific type of interrupt signal (e.g., NMI, SMI, corrected platform error interrupt (CPEI), machine check exception error interrupts (MCERR), etc.) in response to a type of hardware error event (e.g., a corrected hardware error, an uncorrected hardware error, fatal hardware error, etc.). For instance, a hardware functional block 115 may be configured to provide a CPEI when a correctable and/or corrected hardware error is detected by the hardware functional block 115.

In response to a hardware error event, the FW 125 or the OS 120 process and/or handle, using any of a variety of techniques, the hardware error data 135 present (i.e., stored) in either the FEL 140 and/or the OEL 145. In the example of FIG. 1, the FW 125 and the OS 120 may be notified of a hardware error event either via a hardware error interrupt routed by the ESR 160 and/or by polling for new hardware error data 135 present in the FEL 140 and/or the OEL 145. In the illustrated example of FIG. 1, the FW 125 and the OS 120 use software (SW) reads to access hardware error data stored in the FEL 140 and the OEL 145, respectively.

In the illustrated example, certain types of hardware error interrupts (e.g., NMI, MCERR, CPEI) are received and handled by the OS 120 and other types of hardware error interrupts (e.g., SMI) are received and handled by the FW 125. As such, the example ESR 160 may be configured by simply enabling or disabling each type of hardware error interrupt. For instance, the ESR 160 may be configured by the FW 125 to only enable MCERRs (i.e., only route MCERRs to the OS 120 and block all other hardware error based interrupts from the hardware functional blocks 115) and, thus, rely on polling of either the FEL 140 or the OEL 145 to identify corrected hardware errors for which a hardware functional block 115 may have provided a blocked CPEI. In an example implementation, the ESR 160 is implemented via one or more multiplexers with an enable signal provided for each hardware error interrupt type as discussed below in connection with FIG. 2B. Alternatively or additionally, the ESR 160 may be configured to route a hardware error interrupt to another semiconductor package and/or device such as, for example, another device located on the same printed circuit board as the example device 100 of FIG. 1. For example, the hardware error interrupt may be routed from the example device 100 to the other package via an external pin of the example device 100 and a signal trace on the printed circuit board.

FIG. 2A illustrates an example manner of implementing the EDR 150 of FIG. 1. To selectively route the hardware error data 135 to the FEL 140, the example EDR 150 of FIG. 2A includes a first multiplexer 205. Based upon an error detection enable signal 210 provided by the FW 125, the multiplexer 205 either routes the hardware error data 135 or NIL (i.e., no data) to the FEL 140 and to a second multiplexer 215. In response to a MC Bank logging enable signal 220 that is also provided by the FW 125, the second multiplexer 215 routes either the output 225 of the first multiplexer 205 or NIL to the OEL 145. It will be readily apparent to persons of ordinary skill in the art that through appropriate combinations of the enable signals 210 and 220, that the hardware error data 135 may be routed to neither, one or both of the FEL 140 or the OEL 145. In general, all or some of the hardware error data 135 may be stored in the FEL 140 and/or the OEL 145. For example, all of the hardware error data 135 may be stored in the FEL 140 while only a subset of the hardware error data 135 may be stored in the OEL 145. In the illustrated example of FIG. 2, HW writes are used to store outputs from the multiplexers 205 and 215 into the FEL 140 and the OEL 145, respectively.

Other example implementations of the EDR 150 of FIG. 1 abound. For instance, two independent multiplexers could be implemented that allow the FW 125 to enable logging of the hardware error data 135 in FEL 140 and the OEL 145, respectively.

FIG. 2B illustrates an example manner of implementing the ESR 160 of FIG. 1. The example of FIG. 2B illustrates the signal routing for one type of hardware error interrupt such as, for example, an NMI interrupt. To route the NMI interrupt 155, the example ESR 160 of FIG. 1 includes a multiplexer 250 having an enable signal 255. If the enable signal 255 is TRUE, the NMI interrupt 155 is selected by the multiplexer 250 and routed to, for example, the OS 120. If the enable signal 255 is FALSE, the multiplexer 250 selects the NIL signal (i.e., none). In the example of FIGS. 1 and 2B, there is one multiplexer 250 for each type of hardware error interrupt. The FW 125 configures the example ESR 160 by, for example, selecting and/or controlling the enable signal 255.

FIGS. 3 and 4A-D are tables illustrating example hardware error handling configurations (i.e., modes) that may be implemented by the example CEH 105 of FIG. 1 and/or, more generally, by the example device 100 of FIG. 1. The table of FIG. 3 illustrates example hardware error handling modes resulting from various combinations of: (a) the availability of the interface (I/F) 130; (b) whether the detected hardware error is corrected or not as signified column denoted with reference numeral 310; (c) which hardware error interrupts 315 are enabled for routing by the ESR 160; and (d) the enable signal 220. For the example entries illustrated in FIG. 3, the enable signal 210 is TRUE and thus enables logging of the hardware error data 135 in the FEL 140.

A first example table entry 320 is a hardware error-handling mode for corrected hardware errors when the interface 130 is not available, the ESR 160 does not route any hardware related error interrupts as signified with the table entry 315 of NIL and the multiplexer 215 does not route hardware error data 135 to the OEL 145 as signified by the table entry 220 of 1. For the example entry 320, the FEL 140 and the OEL 145 contain the hardware error data 135; the FW 125 does not process the hardware error event and the OS 120 polls the OEL 145 to determine if and/or when a corrected hardware error event occurs.

In another example hardware error-handling configuration 325, FW 125 configures the hardware functional blocks to provide an SMI for a corrected hardware error event, the ESR 160 routes each SMI to the FW 125, and the OEL 145 does not store the hardware error data 135. In this example 325, in response to an SMI, the FW 125 processes the hardware error event using, for instance, an SMI handler.

In yet another example mode 330 where the interface 130 is available, no hardware related error interrupts are enabled and the hardware error data 135 is logged in the FEL 140 and the OEL 145. In this example mode 330, the OS 120 may poll either the OEL 145 and/or via the interface 130 the FEL 140. In light of the above examples, the remaining example entries of FIG. 3 will be readily understood by persons of ordinary skill in the art.

FIG. 4A illustrates an example hardware error-handling configuration (i.e., mode) where the ESR 160 only routes MCERRs and the hardware error data 135 is logged in only the OEL 145. The hardware functional blocks 115 are configured to provide an MCERR for uncorrected and fatal hardware errors. In this example, the OS 120 owns all hardware error resources via the MC Banks 145, and receives an MCERR for uncorrected and fatal hardware errors and polls the OEL 145 for corrected hardware errors. In this example mode, the OS 120 is responsible for the handling and/or processing of all hardware error events.

FIG. 4B illustrates an example hardware error-handling mode where the ESR 160 routes MCERRs and CPEIs to the OS 120 and, again, the hardware error data 135 is logged in only the OEL 145. Likewise, the hardware functional blocks 115 are configured to provide an MCERR for uncorrected and fatal hardware errors and a CPEI for corrected hardware errors. Similar to the example of FIG. 4A, the OS 120 owns all hardware error resources via the MC Banks 145 and handles all hardware error events, but now receives interrupts for corrected, uncorrected and fatal hardware errors from the hardware functional blocks 115.

FIG. 4C illustrates an example hardware error-handling mode where the FW 125 owns all of the hardware error resources and handles all hardware error events. The example mode of FIG. 4C is similar to that conventionally used for computing platforms where some or all of the hardware functional blocks 115 are implemented by one or more chips outside the device 100. In particular, the hardware functional blocks 115 are configured to provide an SMI in response to all types of hardware error events and the hardware error data 135 is logged only in the FEL 140.

FIG. 4D illustrates an example hardware error-handling mode where the FW 125 and the OS 120 may, optionally, jointly own the hardware error resources and hardware error handling responsibilities. In particular, the FW 125 configures the hardware functional blocks 115 to provide a CPEI for corrected hardware errors and an MCERR for uncorrected or fatal hardware errors. The ESR 160 is likewise configured to route both CPEI and MCERR. The hardware error data 135 is logged in the FEL 140 and may also be optionally logged in the OEL 145 if the FW 125 and the OS 120 jointly own and/or process hardware error events. For instance, the OS 120 could handle hardware error events in response to an hardware error interrupt with extended error information and/or data available via, for example, the interface 130 from the FEL 140.

FIG. 5 illustrates a flowchart representative of an example process that may be carried out to operate and/or configure the example CEH 105 of FIG. 1. The example process of FIG. 5 may be executed by a processor core, a processor, a controller and/or any other suitable processing device. For instance, the example process of FIG. 5 may be embodied in coded instructions stored on a tangible medium such as a flash memory, or random access memory (RAM) associated with a processor core (e.g., the example processor core 110 discussed above in connection with FIG. 1). The RAM may be implemented by dynamic random access memory (DRAM), Synchronous DRAM (SDRAM), and/or any other type of RAM device. Alternatively, some or all of the example process of FIG. 5 may be implemented using an application specific integrated circuit (ASIC), a programmable logic device (PLD), a field programmable logic device (FPLD), discrete logic, hardware, firmware, etc. Also, some or all of the example process of FIG. 5 may be implemented manually or as combinations of any of the foregoing techniques, for example, a combination of firmware and/or software and hardware. Further, although the example process of FIG. 5 is described with reference to the flowchart of FIG. 5, persons of ordinary skill in the art will readily appreciate that many other methods of operating and/or configuring the example CEH 105 of FIG. 1 may be employed. For example, the order of execution of the blocks may be changed, and/or some of the blocks described may be changed, eliminated, sub-divided, or combined. Additionally, persons of ordinary skill in the art will appreciate that the example process of FIG. 5 may be carried out sequentially and/or carried out in parallel by, for example, separate processing threads, devices, circuits, etc.

The example process of FIG. 5 begins with the FW 125 determining a hardware error-handling mode for the CEH 105 (block 505). The FW 125 may, for example, read a configuration register, a value stored in a non-volatile memory, read a signal via an external pin, or use any of a variety of other techniques to determine the error-handling mode. In the illustrated examples of FIGS. 1 and 5, the manufacturer of a computing platform that includes the example device 100 of FIG. 1 provides the hardware error-handling mode information read by the FW 125. Alternatively, the provider of the OS 120 or the FW 125 determines the hardware error-handling mode.

The FW 125 then configures the CEH 105 by configuring the ESR 160 (block 510) and the EDR 150 (block 515). In particular, the FW 125 configures the ESR 160 by indicating the hardware error interrupt signals that should be routed to the OS 120 and the FW 125 (block 510); and configures the EDR 150 by enabling the storage of the hardware error data 135 in neither, one or both of the FEL 140 or the OEL 145 (block 515). The FW 125 then configures the functional hardware blocks 115 by configuring each block 115 with an hardware error interrupt signal type for each type of hardware error event (block 520). Control then returns to, for example, a calling program and/or routine.

Figure 6:
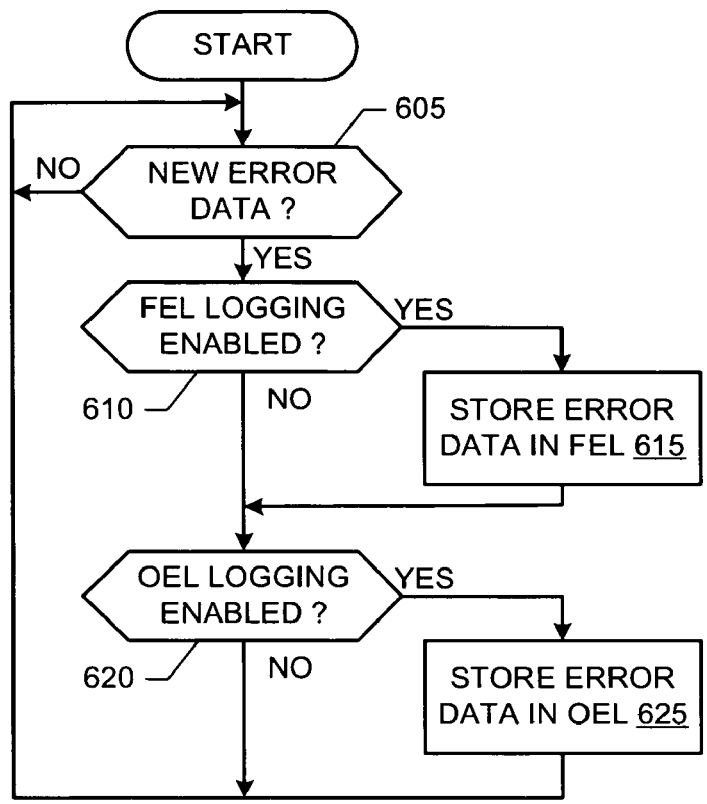
FIG. 6 is a flowchart illustrating an example process that may be carried out to implement the example error data router of FIG. 1.
Figure 7:
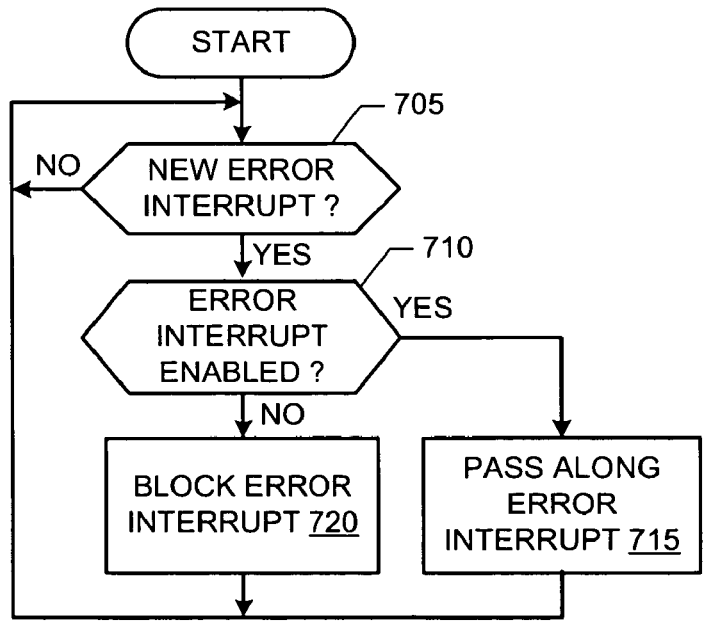
FIG. 7 is a flowchart illustrating an example process that may be carried out to implement the example error signal router of FIG. 1.

FIGS. 6 and 7 illustrate flowcharts representative of example processes that may be carried out to implement the EDR 150 and the ESR 160 of FIG. 1, respectively. Some or all of the example processes of FIGS. 6 and 7 may be implemented using an ASIC, a PLD, a FPLD, logic gates, discrete logic, hardware, firmware, etc. Alternatively, some or all of the example processes of FIGS. 6 and 7 may be executed by a processor core, a processor, a controller and/or any other suitable processing device. For instance, the example processes of FIGS. 6 and 7 may be embodied in coded instructions stored on a tangible medium such as a flash memory, or RAM associated with a processor core (e.g., the example processor core 110 of FIG. 1). The RAM may be implemented by DRAM, SDRAM, and/or any other type of RAM device. Also, some or all of the example processes of FIGS. 6 and 7 may be implemented manually or as combinations of any of the foregoing techniques, for example, a combination of firmware and/or software and hardware. Further, although the example processes of FIGS. 6 and 7 are described with reference to the flowcharts of FIGS. 6 and 7, persons of ordinary skill in the art will readily appreciate that many other methods of implementing the example EDR 150 and ESR 160 of FIG. 1, respectively, may be employed. For example, the order of execution of the blocks may be changed, and/or some of the blocks described may be changed, eliminated, subdivided, or combined. Additionally, persons of ordinary skill in the art will appreciate that the example processes of FIGS. 6 and 7 may be carried out sequentially and/or carried out in parallel by, for example, separate processing threads, devices, circuits, etc.

The example process of FIG. 6 begins with the EDR 150 waiting to receive new hardware error data 135 from one of the hardware functional blocks 115 (block 605). When new hardware error data 135 is received (block 605), the EDR 150 determines if logging of the hardware error data 135 in the FEL 140 is enabled (block 610). If logging in the FEL 140 is enabled (block 610), some or all of the hardware error data 135 is stored in the FEL 140 (block 615). The EDR 150 also determines if logging of the hardware error data 135 in the OEL 145 is enabled (block 620). If logging in the OEL is enabled (block 620), some or all of the hardware error data 135 is stored in the OEL 145 (block 625). Control then returns to block 605 to await more error data 135.

The example process of FIG. 7 begins with the ESR 160 waiting to receive an hardware error interrupt 155 from one of the hardware functional blocks 115 (block 705). When a hardware error interrupt 155 is received (block 705), the ESR 160 determines if the corresponding type of hardware error interrupt is enabled (block 710). If the type of hardware error interrupt is enabled (block 710), the ESR 160 passes (i.e., routes) the hardware error interrupt 155 to the the OS 120 and/or the FW 125 (block 715). Otherwise, the ESR 160 blocks the hardware error interrupt (block 720). Control then returns to block 705 to await another interrupt 155.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method comprising:
    determining an error handling mode from an error handling mode configuration setting for a semiconductor device;
    configuring a hardware function block in the semiconductor device based on the error handling mode; and
    configuring an error-handling circuit in the semiconductor device, wherein the error-handling circuit is configurable to route error information from the hardware function block to firmware and an operating system executing on a processor core located in the semiconductor device.

2. A method as defined in claim 1, wherein configuring the error-handling circuit comprises:
    configuring an error data router to route the error information to at least one of a first error log associated with the operating system or a second error log associated with the firmware; and
    configuring a type of error signal provided by the hardware function block in response to a type of error event.

3. A method as defined in claim 2, wherein the error signal is an interrupt, and wherein when the interrupt is received by at least one of the operating system or the firmware error data corresponding to the interrupt is processed by at least one of the operating system or the firmware.

4. A method as defined in claim 1, further comprising:
    configuring a first multiplexer to selectively route the error data to a first error log; or
    configuring a second multiplexer to selectively route the error data to a second error log.

5. A method as defined in claim 1, farther comprising configuring the error-handling circuit in the semiconductor device to route the error information from the hardware function block to a second semiconductor device.

6. An article of manufacture storing machine accessible instructions which, when executed, cause a machine to:
    determine an error handling mode from an error handling mode configuration setting for a semiconductor device;
    configure a hardware function block in the semiconductor device based on the error handling mode; and
    configure an error-handling circuit in the semiconductor device, wherein the error-handling circuit is configurable to route error information from the hardware function block to firmware and an operating system executing on a processor core located in the semiconductor device.

7. An article of manufacture as defined in claim 6, wherein the machine readable instructions, when executed, cause the machine to:
    configure an error data router to route the error information to at least one of a first error log associated with the operating system or a second error log associated with the firmware; and
    configure a type of error signal provided by the hardware function block in response to a type of error event.

8. An article of manufacture as defined in claim 6, wherein the machine readable instructions, when executed, cause the machine to at least one of:

configure a first multiplexer to selectively route the error data to a first error log; or configure a second multiplexer to selectively route the error data to a second error log.

9. An apparatus comprising:

a hardware functional block in a semiconductor package;

an error handler in the semiconductor package, wherein the error handler is configurable to route error data and to route error signals a processor core in the semiconductor package to determine an error handling mode from an error handling mode configuration setting of the semiconductor package and to configure the hardware functional block and the error handler in the semiconductor device based on the error handling mode configuration setting.

10. An apparatus as defined in claim 9, wherein firmware configures the error handler and the hardware functional block.

11. An apparatus as defined in claim 9, wherein the error handler comprises:

an error data router configurable to route the error data from the hardware functional block to a first error log or a second error log; and an error signal router configurable to route the error signals from the hardware functional block to an operating system and firmware.

12. An apparatus as defined in claim 11, wherein the first error log is implemented with configuration status registers, and wherein the second error log is implemented with at least one of machine check registers or a machine check bank.

13. An apparatus as defined in claim 11, wherein the first error log is accessible to the firmware, and wherein the second error log is accessible to the operating system.

14. An apparatus as defined in claim 13, wherein first error log is also accessible to the operating system via the firmware.

15. An apparatus as defined in claim 9, wherein configuring the hardware functional block comprises configuring a type of error signal provided by the hardware functional block in response to an error event type.

16. An apparatus as defined in claim 9, wherein the error signals are interrupts.

17. An apparatus as defined in claim 9, wherein the hardware functional block is at least one of a memory controller, an input/output controller, or a video graphics adapter.

18. An apparatus as defined in claim 9, wherein the error handler is configurable to route the error signals from the hardware functional block to a second semiconductor package.

19. A configurable error-handling circuit comprising:

an error data router configurable to route error information from a functional block to a first error log and a second error log; and an error signal router configurable to route error signals from the functional block to an operating system and firmware, wherein the configurable error-handling circuit is in a package with a processor and wherein the error data router routes a portion of the error information to the first error log and all of the error information to the second error log.

20. A circuit as defined in claim 19, wherein the firmware configures the error-handling circuit and the functional block.

21. A circuit as defined in claim 19, wherein the error data router comprises:

a first multiplexer to selectively route the error information to the first log; and a second multiplexer to selectively route the error information to the second log.

22. A circuit as defined in claim 21, wherein the firmware configures the error handling circuit and the functional block.

23. A circuit as defined in claim 19, wherein the first error log and the second error log are implemented with registers.

* * * * *

UNITED STATES PATENT AND TRADEMARK OFFICE
CERTIFICATE OF CORRECTION

PATENT NO. : 7,533,300 B2  Page 1 of 1
APPLICATION NO. : 11/352961
DATED : May 12, 2009
INVENTOR(S) : Marisetty et al.

It is certified that error appears in the above-identified patent and that said Letters Patent is hereby corrected as shown below:

Col. 8, line 40: "farther" should be changed to --further--

Signed and Sealed this

Seventeenth Day of November, 2009

David J. Kappos
*Director of the United States Patent and Trademark Office*